US010108053B2

(12) United States Patent
Fan

(10) Patent No.: US 10,108,053 B2
(45) Date of Patent: Oct. 23, 2018

(54) LIQUID CRYSTAL DISPLAY DEVICE WITH PERIPHERAL ELECTRODE

(71) Applicant: OmniVision Technologies, Inc., Santa Clara, CA (US)

(72) Inventor: Chun-Sheng Fan, Zhudong Township (TW)

(73) Assignee: OmniVision Technologies, Inc., Santa Clara, CA (US)

( * ) Notice: Subject to any disclaimer, the term of this patent is extended or adjusted under 35 U.S.C. 154(b) by 21 days.

(21) Appl. No.: 15/299,842

(22) Filed: Oct. 21, 2016

(65) Prior Publication Data
US 2018/0113363 A1    Apr. 26, 2018

(51) Int. Cl.
*G02F 1/1343*    (2006.01)

(52) U.S. Cl.
CPC .... *G02F 1/134309* (2013.01); *G02F 1/13439* (2013.01); *G06F 2203/04113* (2013.01)

(58) Field of Classification Search
CPC ... G02F 1/134309; G02F 2001/133388; G02F 1/13439; G06F 2203/04113
See application file for complete search history.

(56) References Cited

U.S. PATENT DOCUMENTS

| 5,963,289 | A | 10/1999 | Stefanov et al. | |
| 2005/0213000 | A1* | 9/2005 | Akimoto | G02F 1/133509 349/113 |
| 2008/0055529 | A1* | 3/2008 | Shirasaka | G02F 1/134309 349/143 |
| 2009/0244415 | A1* | 10/2009 | Ide | G02F 1/1313 349/33 |
| 2010/0225632 | A1* | 9/2010 | Ma | G02F 1/1339 345/211 |
| 2011/0194062 | A1* | 8/2011 | Lee | G02F 1/1339 349/149 |
| 2011/0242078 | A1* | 10/2011 | Takahashi | G02F 1/1345 345/211 |

(Continued)

FOREIGN PATENT DOCUMENTS

| JP | 2005-215419 A | 8/2005 |
| JP | 2005-274665 A | 10/2005 |

*Primary Examiner* — Jia Pan
(74) *Attorney, Agent, or Firm* — Larry E. Henneman, Jr.; Henneman & Associates, PLC

(57) ABSTRACT

A liquid crystal display device includes a first substrate, a pixel array formed on the first substrate, a transparent substrate, a liquid crystal layer disposed between the pixel array and the transparent substrate, a transparent electrode disposed between the transparent substrate and the liquid crystal layer, and an input electrode. The transparent electrode has a longer first edge and an orthogonal shorter second edge. The input electrode extends along, and is electrically coupled along, the first edge of the transparent electrode and has lower impedance than a portion of the transparent electrode overlying the pixel array. The input electrode can include additional portion(s) that extend along, and that are electrically-coupled along, the other edges of the transparent electrode. The input electrode reduces the common voltage propagation delay across the transparent electrode and improves reduces intensity variation over the display area, even for high-frequency common voltage waveforms.

24 Claims, 12 Drawing Sheets

(56) References Cited

U.S. PATENT DOCUMENTS

| | | | |
|---|---|---|---|
| 2012/0249896 A1* | 10/2012 | Yokota | G02F 1/134336 349/5 |
| 2012/0249920 A1* | 10/2012 | Hara | G09G 3/002 349/61 |
| 2013/0050603 A1* | 2/2013 | Ise | G02F 1/134363 349/43 |
| 2016/0370904 A1* | 12/2016 | Wang | G06F 3/0416 |

* cited by examiner

| Chromaticity Coordinate | CIE Values - White (Right) | CIE Value - White (Left) | Difference |
|---|---|---|---|
| x | 0.3253 | 0.2985 | 0.0268 |
| y | 0.3414 | 0.3015 | 0.0399 |

LIQUID CRYSTAL DISPLAY DEVICE WITH PERIPHERAL ELECTRODE

BACKGROUND OF THE INVENTION

Field of the Invention

This invention relates generally to liquid crystal displays, and more particularly to liquid crystal on silicon (LCoS) displays.

Description of the Background Art

Currently there is a demand for miniature display devices in various commercial and consumer applications. For example, LCoS display devices are being incorporated into many different mobile and automotive devices.

FIG. 1 is a perspective view showing a known liquid crystal display device 100, which is a reflective LCoS light valve. Display device 100 is driven by image processing and control circuitry (not shown) to display images on a display area 102 thereof in accordance with image data received by display device 100. Display area 102 has a long, rectangular format and includes short sides 104 and long sides 106.

FIG. 2 is a cross-sectional view of display device 100 taken along line A-A of FIG. 1. FIG. 2 shows that display device 100 is formed on a silicon substrate (a chip) 202, which includes a pixel array 204 formed thereon. Pixel array 204 includes a plurality of pixels (not shown) arranged in a plurality of columns and a plurality of rows. Because display device 100 is reflective, those skilled in the art will recognize that the pixels of pixel array 204 include reflective pixel mirrors (not shown) that reflect incident light. Also, pixel array 204 generally defines the extents of display area 102 (FIG. 1), such that the short and long edges of pixel array 204 correspond to the short and long sides 104 and 106 of display area 102, respectively.

Display device 100 further includes a lower liquid crystal alignment layer 206, a layer of liquid crystal material 208, an upper liquid crystal alignment layer 210, a transparent electrode 212, a transparent (e.g., glass) substrate 214, and a gasket 216 retaining liquid crystal layer 208 between lower and upper alignment layers 206 and 210. Transparent electrode 212 is formed on a bottom surface of transparent substrate 214 from a layer of Indium Tin Oxide (ITO) and functions as a common electrode for display device 100. Alignment layers 206 and 210 are formed over pixel array 204 and transparent electrode 212, respectively, and facilitate alignment of the liquid crystals in liquid crystal layer 208 in a desired direction. An electrical contact 218 is electrically coupled to transparent electrode 212 adjacent a short edge of pixel array 204 and facilitates the assertion of a series of common voltages from a voltage controller 220 on transparent electrode 212. It is desirable to modulate the voltages supplied by voltage controller 220 at high frequency in order to implement imaging techniques such as debiasing of the liquid crystal layer 208, image dithering, etc.

During operation of display device 100, incident light 222 is polarized in a first predetermined polarization state by a polarizer 224 and enters through the top surface of transparent substrate 214, passes through layers 214, 212, 210, 208, and 206, is reflected off the pixel mirrors of pixel array 204, and then passes again through the layers 206, 208, 210, 212, and 214, before exiting display device 100. The polarization of the light is altered by liquid crystal layer 208, depending on the electrical field applied across the liquid crystal. When transparent electrode 212 is held at a particular voltage, the electrical field across liquid crystal layer 208 is controlled by the voltages asserted on the pixel mirrors (not shown) of pixel array 204. Thus, the polarization of the incident light is spatially modulated in accordance with an image asserted on pixel array 204, and the light is output as a modulated beam 226. The modulated beam 226 is then analyzed by an analyzer 228 having a predetermined polarization state to produce a displayable image. The intensity of light displayed for each pixel thus depends on the polarization imparted by the liquid crystal.

FIG. 3 shows a top view of display device 100, which illustrates a problem associated with display devices having a long, narrow transparent electrode 212. In particular, pixels located at different points P1 and P2 on pixel array 204 will display the same intensity value differently. For example, if pixels at points P1 and P2 are each driven in a fully "on" or "bright" state, the pixel at point P1 will appear noticeably darker than the pixel at P2. This intensity variation becomes very apparent when the transparent electrode 212 of display device 100 is driven at a high voltage frequency. However, some intensity variation may even be observed even when transparent electrode 212 is driven at a low voltage frequency. Moreover, in three-color systems, such variations in the intensities of individual colors can create perceived color distortions in the displayed image. For these reasons, non-uniformity in the representation of intensity values across the display area is undesirable.

What is needed, therefore, is an LCoS display device capable of displaying intensity values uniformly across its display area. What is also needed is an LCoS display device that can be driven with a high voltage frequency on its common electrode without sacrificing image quality.

SUMMARY

The present invention overcomes the problems associated with the prior art by providing a peripheral input electrode that efficiently distributes voltage changes across the transparent electrode of the display. The invention facilitates driving the common electrode of the display device with a high-frequency voltage waveform while improving intensity uniformity across the viewable region of the display.

A liquid crystal display device according to an exemplary embodiment of the invention includes a first substrate, a pixel array formed on the first substrate, a transparent substrate disposed a spaced distance over the pixel array, a liquid crystal layer disposed between the pixel array and the transparent substrate, a transparent electrode disposed between the transparent substrate and the liquid crystal layer, and an input electrode. The transparent electrode is formed from a thin, conductive material, has a first edge extending in a first direction, and has a second edge extending in a second direction, where the first edge is longer than the second edge. Additionally, the input electrode extends along, and is electrically coupled along, the first edge of the transparent electrode and has lower impedance than a portion of the transparent electrode overlying the pixel array. The liquid crystal display device can also include a liquid crystal alignment layer formed over the transparent electrode and the input electrode. The input electrode provides a means for uniformly asserting a high-frequency signal on the portion of the transparent electrode overlying the pixel array.

In various embodiments, the first substrate is a reflective liquid crystal on silicon (LCoS) backplane and/or the transparent electrode is formed from Indium Tin Oxide (ITO).

The input electrode can also be formed from a material (e.g., aluminum, etc.) that has a higher electrical conductivity than the conductive material of the transparent electrode. The length of the input electrode along the first direction can also be longer than the length of the pixel array along the first direction. In still another particular embodiment, the thickness of the conductive material of the transparent electrode is approximately 20 nanometers. In yet another embodiment, a ratio of the length of said first edge of the transparent electrode to the length of said second edge is at least 5:1.

Various particular embodiments of the input electrode are also disclosed. For example, the input electrode can additionally extend along and be electrically coupled along the second edge of the transparent electrode. Still more particularly, where the transparent electrode includes a third edge opposite the first edge that also extends along the first direction, the input electrode can additionally extend along and be electrically coupled along the third edge of the transparent electrode. Even more particularly, where the transparent electrode includes a fourth edge opposite the second edge that extends along the second direction, the input electrode can additionally extend along and be electrically coupled along the fourth edge of the transparent electrode. In still another embodiment, the display device further includes a second input electrode extending along and electrically coupled along a third edge of the transparent electrode, where the third edge is located opposite the first edge and extends along the first direction. In such a case the second input electrode has lower impedance than the portion of the transparent electrode overlying the pixel array.

A method for manufacturing at least a portion of a liquid crystal display device having a pixel array is also disclosed. The method includes the step of providing a transparent substrate having a transparent electrode formed thereon, where the transparent electrode is formed from a thin, conductive material, has a first edge extending in a first direction, and has a second edge extending in a second direction, where the first edge is longer than the second edge. This method further includes the step of forming an input electrode that extends along the first edge of the transparent electrode and that is also electrically coupled along the first edge, where the input electrode has lower impedance than a portion of the transparent electrode intended for overlying the pixel array. A particular method further includes the steps of providing a display substrate having the pixel array formed thereon, mounting the transparent substrate over the display substrate such that the transparent electrode faces the pixel array, and forming a liquid crystal layer between the transparent electrode and the pixel array.

Various particular methods of forming input electrodes according to the invention are also disclosed. For example, one particular method further includes forming the input electrode on the transparent electrode such that the input electrode additionally extends along and is electrically coupled along the second edge of the transparent electrode. Where the transparent electrode further includes a third edge opposite the first edge and that extends along the first direction, a more particular method includes the step of forming the input electrode on the transparent electrode such that the input electrode additionally extends along and is electrically coupled along the third edge. An even more particular method can further include the step of forming the input electrode on the transparent electrode such that the input electrode additionally extends along and is electrically coupled along a fourth edge of the transparent electrode, where the fourth edge is located opposite the second edge and extends along the second direction.

As yet another option for forming the input electrode, a second input electrode can be formed extending along a third edge of the transparent electrode and being electrically coupled to the transparent electrode along the third edge. In such a method, the second input electrode has lower impedance than the portion of the transparent electrode for overlying the pixel array, and the third edge of the transparent electrode is located opposite the first edge and extends along the first direction.

BRIEF DESCRIPTION OF THE DRAWINGS

The present invention is described with reference to the following drawings, wherein like reference numbers denote substantially similar elements.

DETAILED DESCRIPTION

Figure 1:
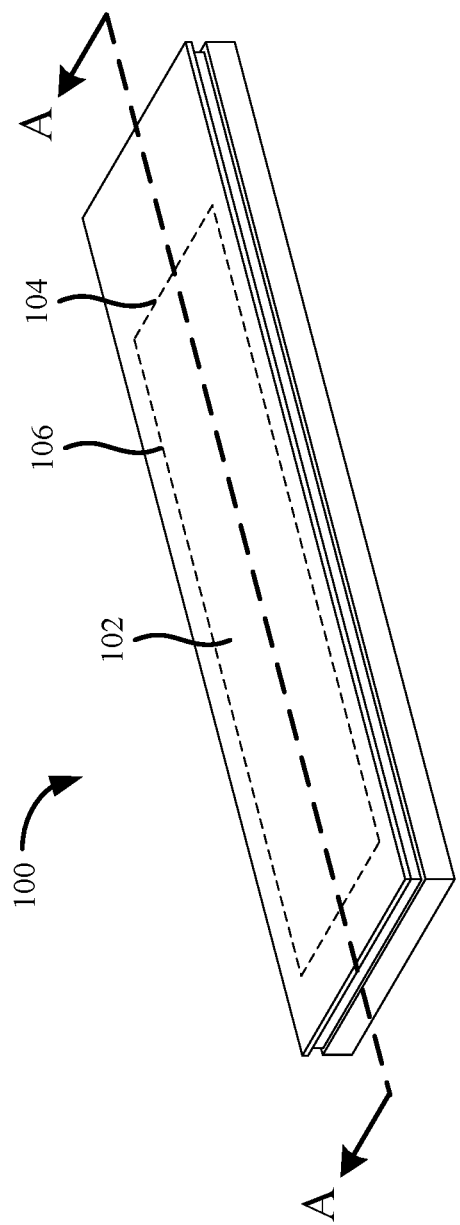
FIG. 1 is a perspective view of a prior art display device.

The present invention overcomes the problems associated with the prior art, by providing an input electrode that extends along and that is electrically-coupled along at least a portion of the periphery of the transparent electrode of an LCoS display device. The input electrode facilitates driving the transparent electrode with a high-frequency voltage waveform while minimizing intensity variation across the device's display area. In the following description, numerous specific details are set forth (e.g., particular input electrode designs, particular display device structures, etc.) in order to provide a thorough understanding of the invention. Those skilled in the art will recognize, however, that the invention may be practiced apart from these specific details. In other instances, details of well-known liquid crystal display manufacturing practices (e.g., pixel array formation, layer formation, etc.) and components have been omitted, so as not to unnecessarily obscure the present invention.

The inventors have found that the intensity variation in prior art LCoS display devices occurs because the impedance of the transparent electrode 212 increases proportionally with the distance from the voltage source (i.e., electrical contact 218). Considering FIG. 3 again, the impedance of transparent electrode 212 between point P1 and electrical contact 218 is greater than the impedance of transparent electrode 212 between point P2 and electrical contact 218.

This impedance mismatch, in turn, means that the voltage response time of the transparent electrode 212 also increases as the distance from the electrical contact 218 increases. Thus, when voltage controller 220 switches the voltage on transparent electrode 212 at electrical contact 218, and the voltage has not transitioned to the new value over the entire pixel array 204 by the time data is asserted, then the same intensity value asserted on pixels at different locations of the pixel array will appear differently (non-uniformly). This disparate intensity effect is exacerbated when high-frequency voltage waveforms (e.g., ITO voltage frequencies greater than or equal to 1.0 kHz) are applied to the transparent electrode and/or for long, narrow display devices (e.g., those with a transparent electrode 212 having a long-edge-to-short-edge ratio greater than or equal to 5:1), because the voltages change faster than they can propagate and stabilize across the transparent electrode 212 for the data assertion.

This impedance mismatch is also more problematic in display devices where the transparent electrode is very thin. For example, the impedance of ITO is inversely proportional to its thickness and increases very rapidly for thin ITO layers (e.g., those of 60 nm or less) as the distance to the voltage source increases. While impedance of the ITO layer can be decreased by increasing its thickness, doing so is not a good solution to reducing impedance variation, because the optical transparency of the ITO is also inversely proportional to its thickness. Thus, increasing the thickness of the ITO would significantly decrease the transparency of the display device and degrade its optical efficiency.

In summary, the inventors have determined that, to achieve optimal imaging performance and uniformity of intensity across the display area, it is desirable to minimize the impedance of the transparent electrode between the common voltage input and points across the portion of the transparent electrode that overlies the pixel array. To these same ends, it is also desirable for the transparent electrode to have very high optical transparency across the visible spectrum.

Figure 4:
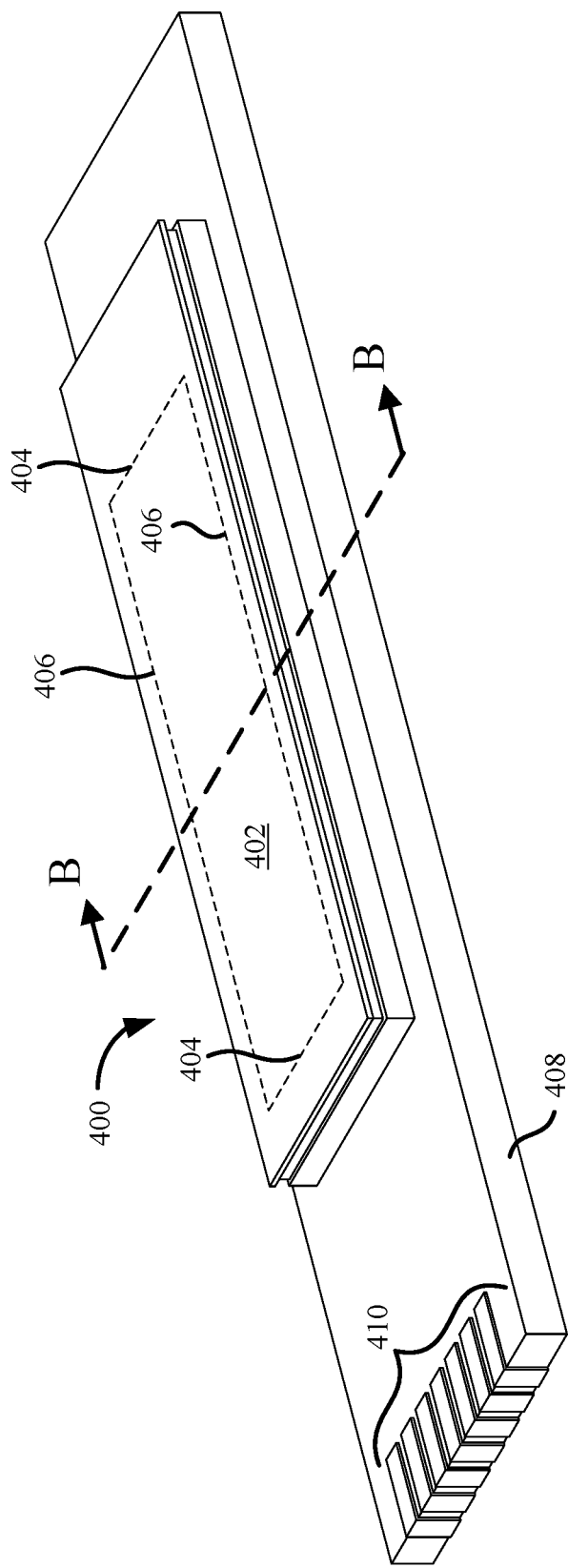
FIG. 4 is a perspective view of a display device with an input electrode according to an exemplary embodiment of the present invention.

FIG. 4 is a perspective view showing a reflective LCoS display device 400 according to one embodiment of the invention. Display device 400 is driven by image processing and control circuitry (not shown) to display an image on its display area 402. The display area 402 of display device is long and narrow, comprising long sides 406 that are significantly longer than its short sides 404. FIG. 4 also shows display device 400 electrically-coupled to a circuit substrate 408, which enables display device 400 to communicate with and be powered by a host device via I/O terminals (pins) 410. As will be described below, display device 400 includes a peripheral input electrode that ensures rapid voltage propagation across its common transparent electrode, which results in intensity values being displayed uniformly across display area 402, even for high-frequency waveforms.

Figure 5:
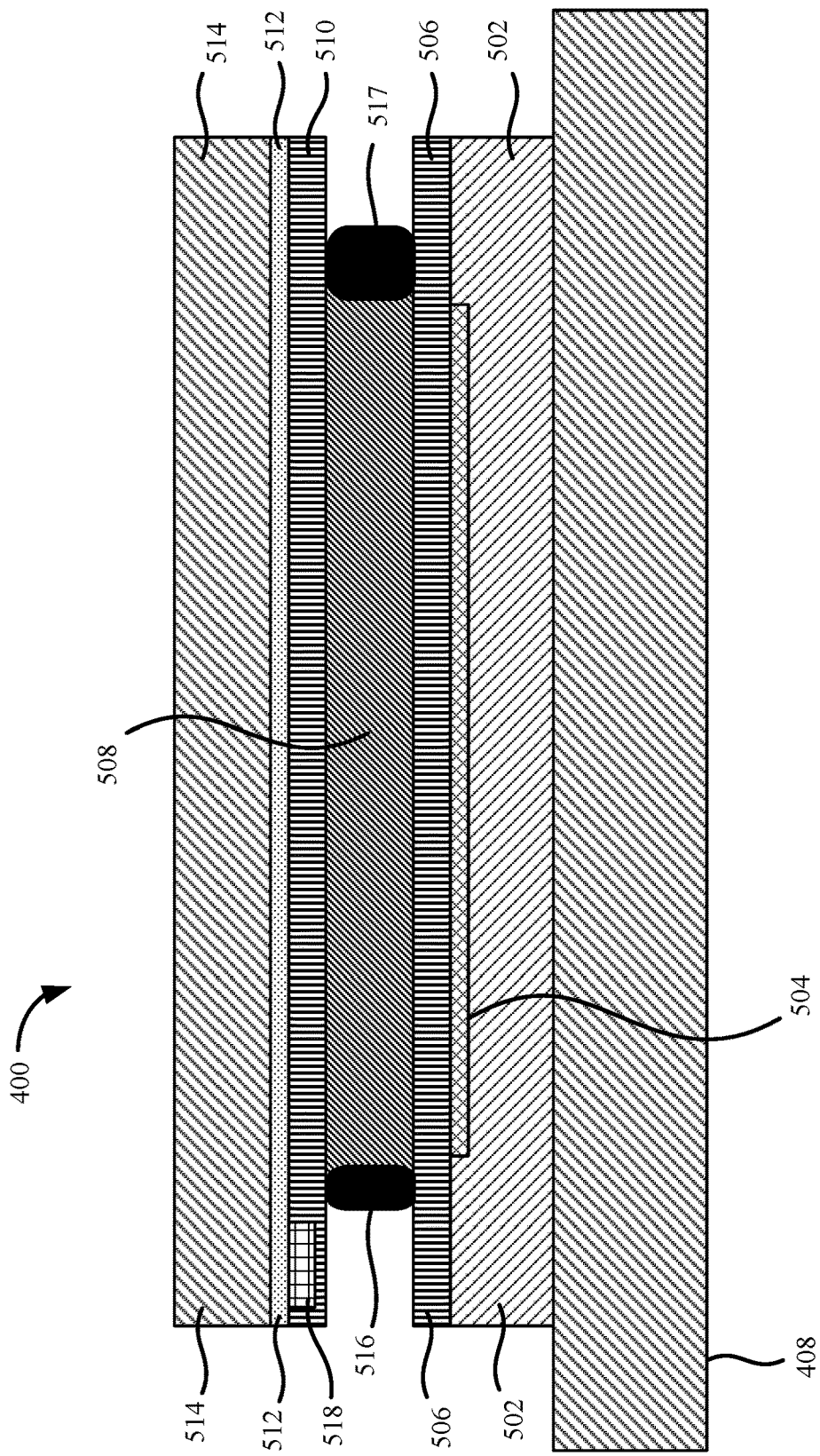
FIG. 5 is a cross-sectional view of the display device of FIG. 4.

FIG. 5 is a cross-sectional view of display device 400 and substrate 408 taken along line B-B of FIG. 4. FIG. 5 shows that display device 500 includes a silicon substrate (a chip) 502 having a pixel array 504 formed therein. Display device 500 also includes a lower liquid crystal alignment layer 506 formed over pixel array 504, a layer of liquid crystal material 508 formed between lower alignment layer 506 and an upper liquid crystal alignment layer 510, a transparent electrode 512 having alignment layer 510 formed thereon, and a transparent (e.g., glass) substrate 514 having transparent electrode 512 formed thereon. A gasket 516 surrounds and retains liquid crystal layer 508 between lower and upper alignment layers 506 and 510. Gasket 516 surrounds and retains liquid crystal layer 508. A plug 517 is inserted in an opening (not shown) of gasket 516 to seal gasket 516 and the liquid crystal material therein. Pixel array 504 includes a plurality of reflective pixels (e.g., pixel mirrors, not shown) arranged in a plurality of columns and a plurality of rows, which modulate incident light in accordance with image data asserted thereon as discussed above.

Transparent electrode 512 is a layer of conductive material (ITO in this embodiment) formed over substantially the entire bottom surface of transparent substrate 514. Accordingly, the limits of transparent electrode 512 correspond to the limits of transparent substrate 514. Here, transparent substrate 514 has dimensions of 25 mm×4 mm, which results in a ratio of long-to-short edges of transparent electrode 512 of 6.25:1. Additionally, the layer of ITO is very thin (e.g., less than 60 nanometers) for high optical performance. In a particular embodiment, the ITO layer has a thickness of approximately 20 nm, which is transparent for about 95% of the wavelengths in the visible spectrum. Thus, transparent electrode 512 has a high resistivity and, without the input electrode of the present invention, would have significant impedance variation, especially along its long dimension.

To minimize this impedance variation, display device 400 includes an input electrode 518, which is formed directly on transparent electrode 512 in this embodiment. Input electrode 518 is elongated such that it extends (into and out of the page) along, and is electrically-coupled along, a long edge of transparent electrode 512. Additionally, input electrode 518 is designed to have lower impedance than the impedance of at least the portion of transparent electrode 512 that overlies pixel array 504. This ensures that voltage propagation through input electrode 518 is faster than voltage propagation through the portion of transparent electrode 512 overlying pixel array 504.

To help meet these impedance goals, input electrode 518 is manufactured from a material that has a significantly lower resistivity, and therefore a higher electrical conductivity, than the material (e.g., ITO) from which transparent electrode 512 is formed. For a transparent electrode 512 made of ITO, input electrode 518 can be made from any of aluminum (Al), silver (Ag), chromium (Cr), or titanium (Ti), each of which has a resistivity that is significantly lower than the resistivity of ITO at a thickness of 20 nm. In a particular embodiment, input electrode 518 is formed from aluminum (e.g., for cost savings) at a line width in the range of 100-300 micrometers (μm) and at a thickness in the range of 100-500 nm. In addition to type of material, impedance can also depend on other variables such as length, cross-sectional area, frequency, capacitance, etc.

Input electrode 518 can be formed using any suitable deposition process(es) available in the art (e.g., photolithography, sputtering, chemical vapor deposition, etc.). According to a particular method, input electrode 518 is formed by first providing a transparent substrate 514 having transparent electrode 512 formed thereon. Thereafter, a thin metallic (e.g., aluminum) film is applied over transparent electrode 512 either by vapor deposition or by sputter coating. Next, a layer of photoresist is applied over the aluminum film and exposed to form (pattern) input electrode 518 in the desired shape. Then, the unexposed portion of the photoresist along with the underlying metal is etched away. During etching, the exposed photoresist protects the portion of the metal layer corresponding to the input electrode 518 and prevents it from being etched away. Thus, the metal input electrode 518 in the desired shape remains. (Opposite patterning and exposure, such as with a positive resist, can also be used to form input electrode 518 in the desired shape.) The transparent electrode 512 and input electrode 518 can then undergo washing and cleaning as needed. Upper liquid crystal alignment layer 510 can thereafter be formed (e.g., by a spin-on process, by chemical vapor deposition, etc.) over input electrode 518.

Figure 6:
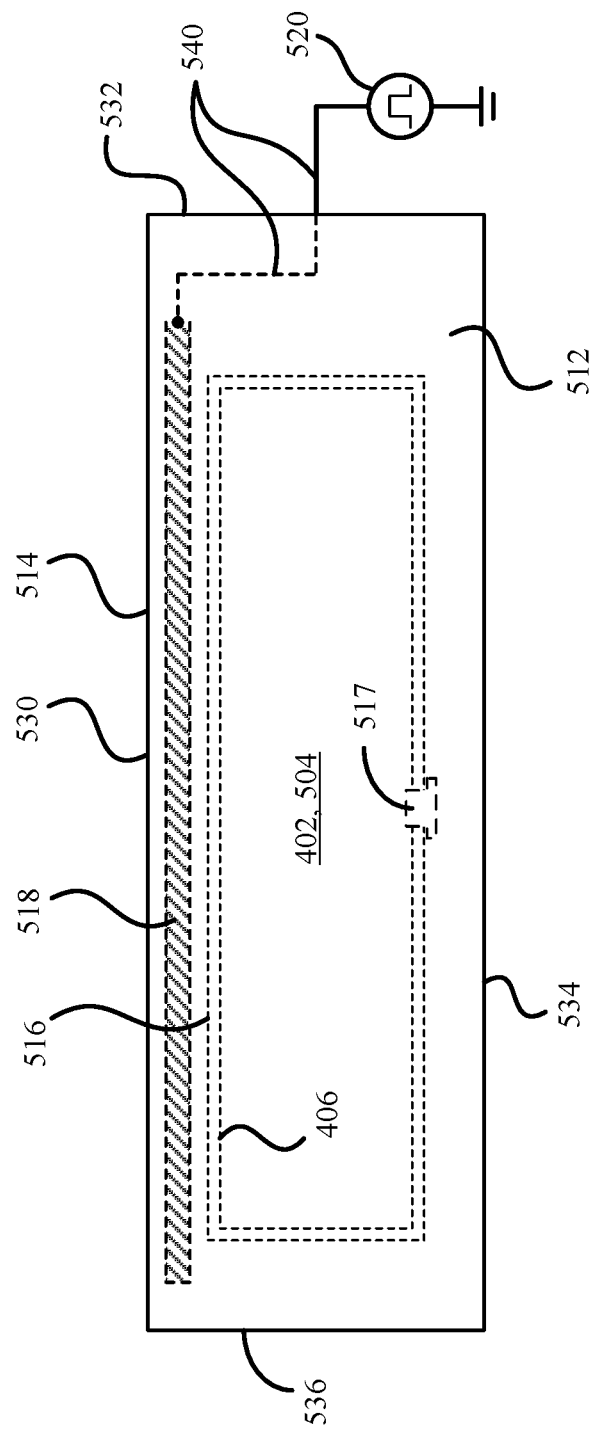
FIG. 6 is a top view of the display device of FIG. 4.

FIG. 6 is a top view of display device 400 showing transparent electrode 512 electrically-coupled to voltage controller 520 via input electrode 518. (Input electrode 518 is shown in cross-hatching for better viewing purposes only.) As mentioned above, the limits of transparent electrode 512 correspond to the limits of transparent substrate 514 in this embodiment. Therefore, transparent electrode 512 defines a first edge 530 extending in a first direction (horizontal in the view of FIG. 6), a second edge 532 extending in a second direction (vertical in the view of FIG. 6), a third edge 534 extending in a third direction, and a fourth edge 536 extending in a fourth direction. Here, the third and fourth directions correspond to the first direction and second directions, respectively, such that first and third edges 530 and 534 are parallel and second and fourth edges 532 and 536 are parallel. Additionally, the first and third edges 530 and 534 of transparent electrode layer 512 are longer than the second and fourth edges 532 and 536 of transparent electrode layer 512.

Input electrode 518 is elongated and extends in the first direction along the majority of the length of first edge 530 of transparent electrode 512. Similarly, input electrode 518 extends parallel to the entire long-edge of pixel array 504, and beyond. Input electrode 518 is also electrically coupled to transparent electrode 512 along first edge 530. In this embodiment, input electrode 518 maintains a generally continuous electrical connection with transparent electrode 512, but in other embodiments, input electrode 518 can comprise a plurality of discrete electrical connections with transparent electrode 512 along first edge 530.

Input electrode 518 is also electrically coupled to voltage controller 520 via circuitry 540, which is shown representationally. Circuitry 540 is representative of a highly-conductive electrical pathway that communicates voltage from voltage controller 520 to input electrode 518. Accordingly, circuitry 540 can be formed on or in any of transparent electrode 512, silicon chip 502, circuit substrate 408, and/or can be part of any other element interposed between voltage controller and input electrode 518 using methods available in the art.

The invention provides important advantages over the prior art, because it enables a common voltage to be quickly and uniformly asserted across transparent electrode 512. In particular, the invention reduces the distance that an asserted voltage must propagate through transparent electrode 512 before it is uniformly asserted (asserted at the desired voltage) over all of pixel array 104. Stated another way, input electrode 518 limits the impedance between input electrode 518 and any point of transparent electrode 512 overlying pixel array 504 to an amount less than the impedance across the short dimension (i.e., across short edges 532 and 536) of transparent electrode 512. Therefore, a uniform common voltage can be more quickly asserted on the portion of transparent electrode 512 overlying pixel array 504, which in turn enables individual intensity values to be displayed more uniformly over the entire pixel array 504.

In contrast to input electrode 518, any voltage asserted on electrical contact 218 of prior art display device 100 (FIG. 3) needs to traverse the majority of the length of the long sides of display device 100 before the desired voltage will be asserted over the entire pixel array 204. As explained above, this results in the same intensity value being displayed differently at different locations across the display area 102, especially when voltage modulated at high frequency is applied to the transparent electrode 212. For these same reasons, input electrode 518 also enables transparent electrode 512 to be formed from a very thin layer of ITO (e.g., 20 nm thick) that has excellent optical transparency.

Figure 7:
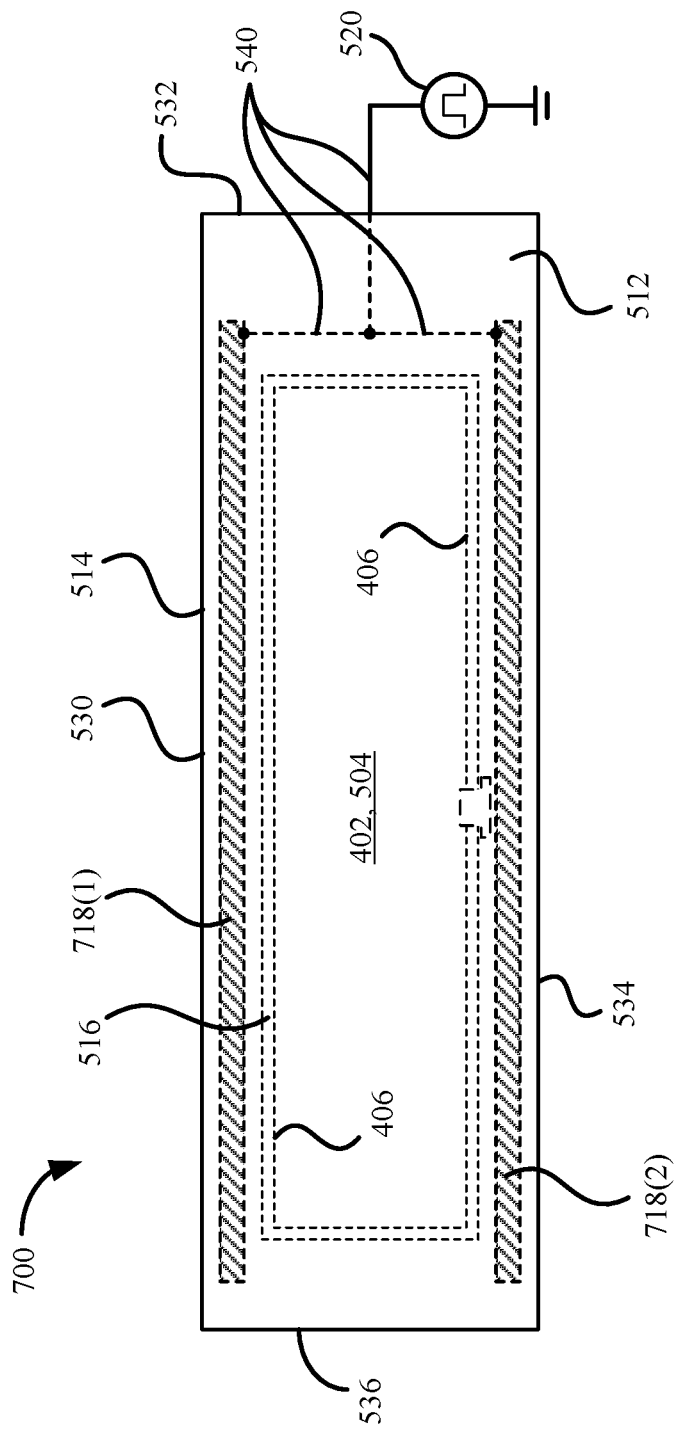
FIG. 7 is a top view of a display device according to another exemplary embodiment of the present invention.

FIG. 7 shows a top view of a display device 700 including a plurality of input electrodes 718 according to another exemplary embodiment of the invention. Display device 700 is similar to display device 400 (FIGS. 4-6). Accordingly, descriptions of elements of display device 700 having like reference numbers to those shown for display device 400 are not repeated.

Display device 700 includes a first input electrode 718(1), which extends along and is electrically coupled along first edge 530 of transparent electrode 512, and a second input electrode 718(2), which extends along and is electrically coupled along third edge 534 of transparent electrode 512. Thus, each of input electrodes 718(1) and 718(2) extend in the same direction, parallel to edges 530 and 534 and the long sides 406 of display area 402 of pixel array 504. Each of input electrodes 718(1-2) is substantially similar to input electrode 518 and, therefore, has lower impedance than the portion of transparent electrode 512 overlying pixel array 504.

Also like input electrode 518, each of input electrodes 718(1) and 718(2) is electrically coupled to receive a common voltage waveform from voltage controller 520 via circuitry 540 and then apply that voltage waveform to transparent electrode 512. Input electrodes 718(1-2) provide the advantage that transparent electrode 512 can be driven at even higher frequency than display device 400, without suffering distracting non-uniformities in intensity, because voltage changes will propagate across the portion of transparent electrode 512 overlying pixel array 504 from opposite long sides 406 of pixel array 504. In this embodiment, a common voltage asserted on input electrodes 718(1) and 718(2) needs only to propagate through transparent electrode 512 a distance that is less than one-half the length of one short edges 532 and 536. Accordingly, the impedance between one of input electrodes 718(1-2) and any point on transparent electrode 512 over display area 402 is reduced even further over the display device 400.

Figure 8:
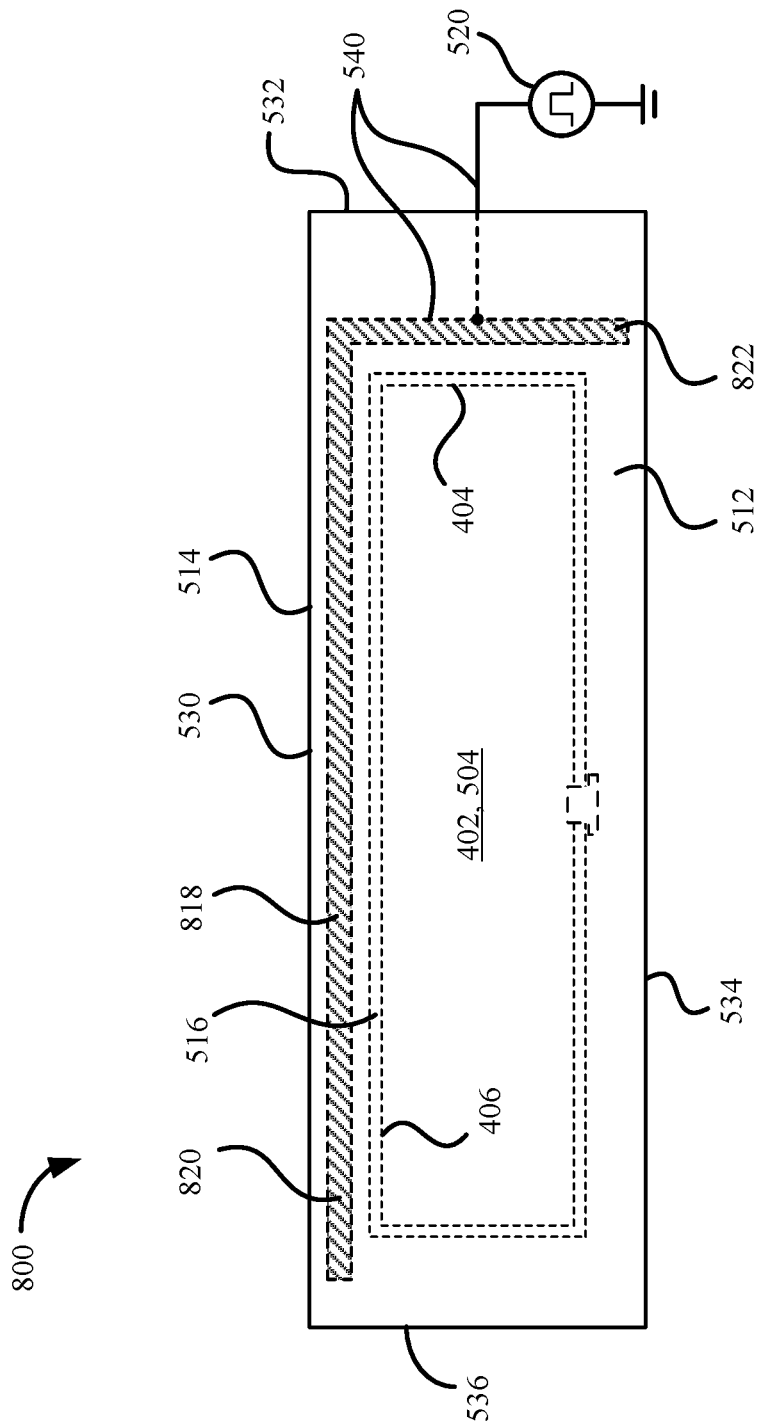
FIG. 8 is a top view of a display device according to a third exemplary embodiment of the present invention.

FIG. 8 shows a top view of a display device 800 including an input electrode 818 according to a third exemplary embodiment of the invention. Input electrode 818 is "L-shaped" and is located adjacent two sides of pixel array 504. In particular, input electrode 818 includes a longer first portion 820 that extends along first edge 530 of transparent electrode 512 and a shorter second portion 822 that extends along second edge 532 of transparent electrode 512. In this embodiment, voltage controller 520 is electrically coupled via circuitry 540 to the second portion 822 of input electrode 818. Portions 820 and 822 are connected together, so second portion 822 efficiently communicates voltages to first portion 820. As before, input electrode 818 has lower impedance than the portion of transparent electrode 512 overlying pixel array 504 and can be formed from aluminum in the proportions discussed above. Input electrode 818 quickly distributes the common voltages provided by voltage controller 520 along both a long edge 406 and a short edge 404 of the display area 402. Such voltages quickly propagate from there across the portion of transparent electrode 512 overlying pixel array 504, and intensity values are represented more uniformly over display area 402.

Figure 9:
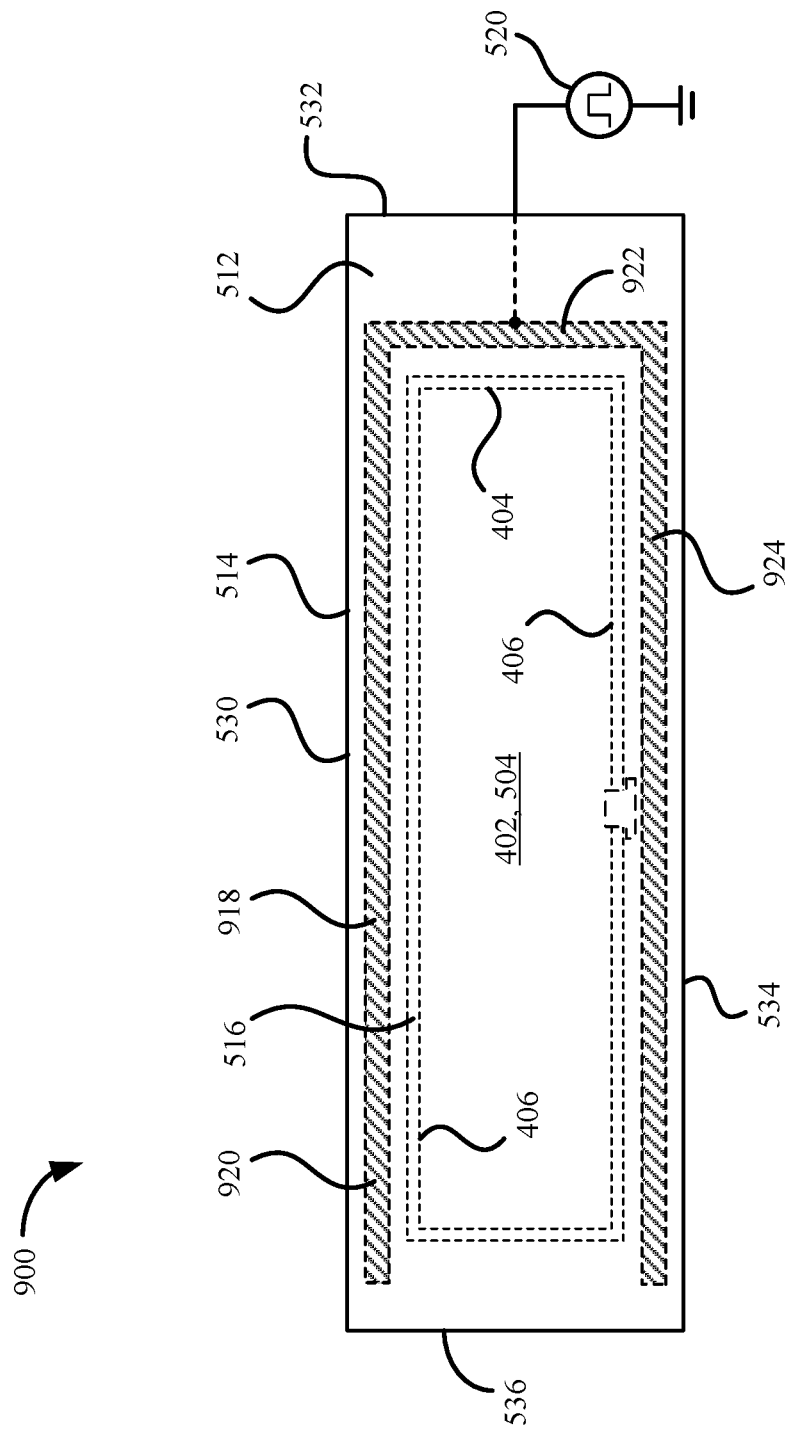
FIG. 9 is a top view of a display device according to a fourth exemplary embodiment of the present invention.

FIG. 9 shows a top view of a display device 900 including an input electrode 918 according to a fourth exemplary embodiment of the invention. Input electrode 918 is "U-shaped" in this embodiment and is located adjacent three sides of display area 402. In particular, input electrode 918 includes a long first portion 920 extending along first edge 530 of transparent electrode 512, a short second portion 922 extending along second edge 532, and a long third portion 924 extending along third edge 534. Thus, input electrode 918 provides a generally continuous electrical connection along three edges of transparent electrode 512. Input electrode 918 has lower impedance than the portion of transparent electrode 512 overlying pixel array 504 and can again be formed from aluminum in the proportions discussed above. Input electrode 918 distributes the voltages provided by voltage controller 520 along both long edges 406 and one short edge 404 of display area 402 such that changes in voltage quickly propagate across the portion of transparent electrode 512 overlying pixel array 504 due to reduced impedance therebetween, and intensity uniformity across the pixel array 504 of display device 900 is again improved over the prior art.

Figure 10:
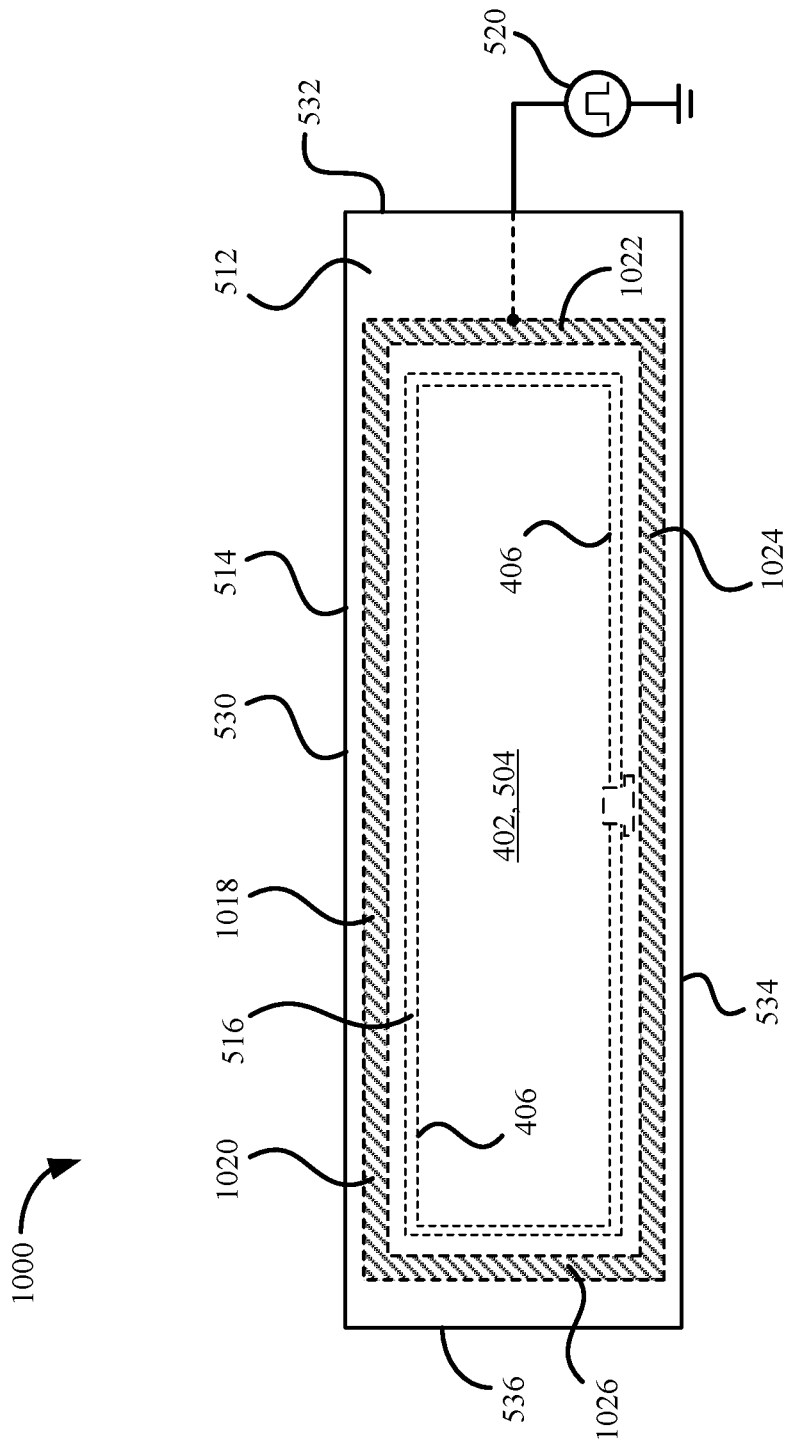
FIG. 10 is a top view of a display device according to a fifth exemplary embodiment of the present invention.

FIG. 10 shows a top view of a display device 1000 including an input electrode 1018 according to a fifth exemplary embodiment of the invention. As shown, input electrode 1018 is rectangular and is disposed around the entire perimeter of pixel array 504. Input electrode 1018 includes a long first portion 1020 extending along first edge 530 of transparent electrode 512, a short second portion 1022 extending along second edge 532, a long third portion 1024 extending along third edge 534, and a short fourth portion 1026 extending along fourth edge 536 of transparent electrode 512. Thus, input electrode 1018 is electrically coupled (e.g., continuously connected, etc.) along each edge of transparent electrode 512 and all the way around display area 402. As above, input electrode 1018 has lower impedance than the portion of transparent electrode 512 overlying pixel array 504 and can be formed from aluminum in the proportions discussed above. The voltages provided by voltage controller 520 are, therefore, asserted along each edge of transparent electrode 512 and along each edge of display area 402. This enables the voltage to propagate through the portion of transparent electrode 512 overlying pixel array 504 very quickly. This, in turn, enables display device 1000 to uniformly display intensity values across pixel array 504, even for waveforms supplied by voltage controller 520 that switch voltage at high frequency.

In the above embodiments, the input electrodes have been described as "extending along" various edges of transparent electrode 512. The phrase "extending along" should be thought of expansively. In the embodiments described above, the input electrodes "extend along" associated perimeter edges 530-536 of transparent electrode 512 in between those edges and the portion of transparent electrode 512 overlying pixel array 504 (display area 402). However, other embodiments of input electrodes could be envisioned that "extend along" the edges of transparent electrode 512 by being disposed directly over those edges, for example, where transparent electrode 512 does not cover the entire surface of transparent substrate 512. In still other embodiments, an input electrode can be disposed over the transparent substrate 514 and extend along an edge of transparent electrode 512 but be located outside the coverage area of transparent electrode 512. Such an input electrode can include multiple spaced apart electrical connections to the edge(s) of transparent electrode 512. These and other modifications will be apparent in view of the above disclosure.

In summary, the embodiments described above reduce the voltage signal propagation delay across the transparent electrode 512 in both the long and short directions of the display device. Accordingly, the impedance variation between the input electrode and different locations of the transparent electrode 512 overlying pixel array 504 is minimized along with non-uniformities in the same intensity values asserted at different locations across pixel array 504. In the case that either a high-frequency (e.g., ≥1.0 kHz for LCoS) or low-frequency (e.g., <1.0 kHz for LCoS) common voltage waveform is applied to transparent electrode 512, the input electrodes of the present invention reduce the intensity variation across the long and short dimensions of the pixel array 502, thereby improving the displayed image.

Figures 11A, 11B:
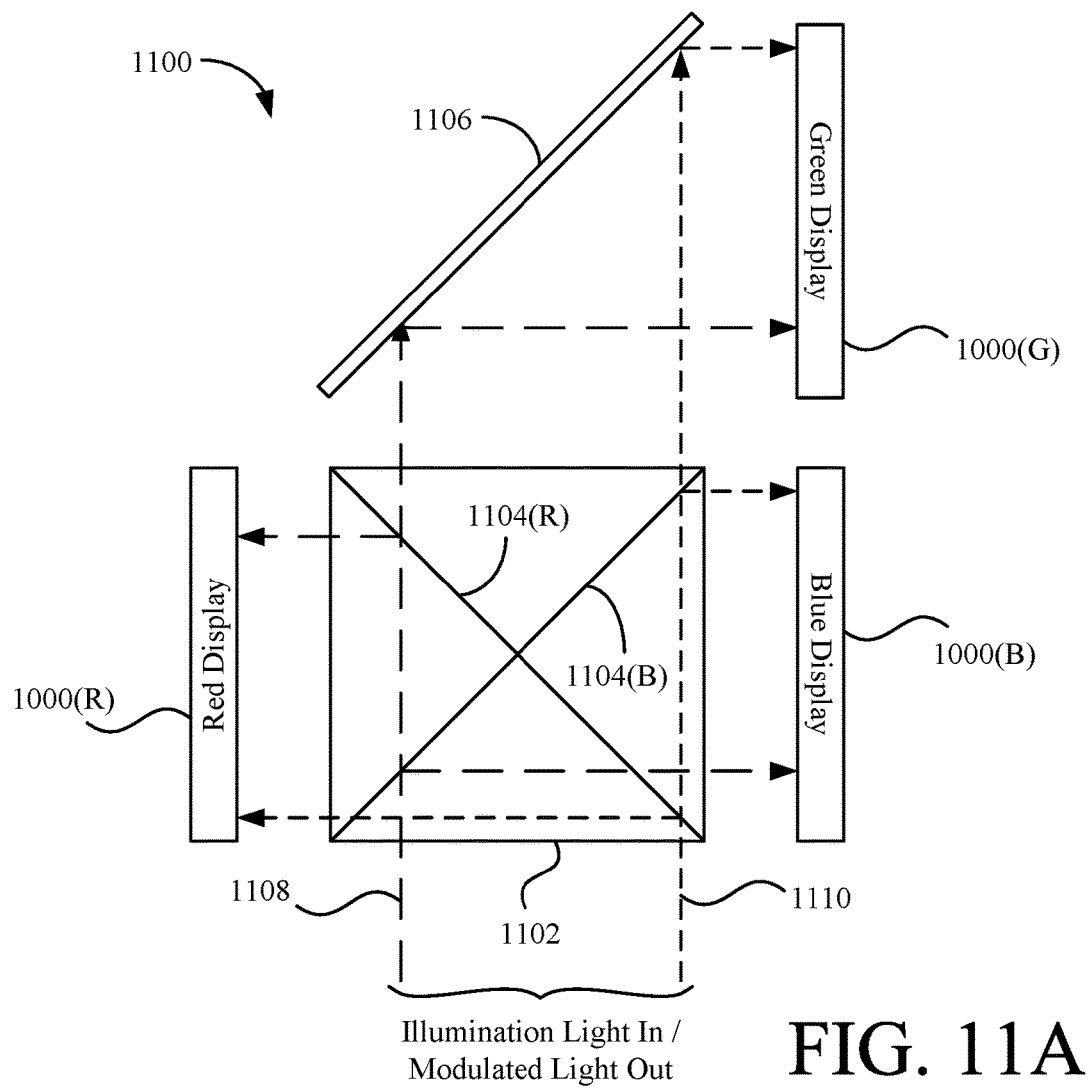
FIG. 11A is a block diagram illustrating a three-color display system incorporating display devices of the present invention.
FIG. 11B is a table illustrating white point variation in a 3-color display system, which is alleviated by using the display devices of the present invention.

FIG. 11A is a block diagram illustrating an exemplary three-color display system 1100 utilizing three LCoS display devices 1000 (FIG. 10) of the present invention. Display devices 1000(R), 1000(G), and 1000(B) modulate light for the red, green, and blue channels, respectively, of display system 1100. Light from a white light source (not shown) enters display system 1100 and is separated into red, green, and blue components by a beam splitter/combiner 1102, which in this embodiment, comprises crossed dichroic filters 1104(R) and 1104(B). Those skilled in the art will understand that the color components need not be monochromatic and that each color component can contain light of various wavelengths. Dichroic filters 1104(R) and 1104(B) reflect red and blue light, respectively, and allow the remaining colors to pass. Thus, the blue component of the light, which can pass through dichroic filter 1104(R), is reflected by dichroic filter 1104(B) onto blue display device 1000(B). Similarly, the red component of the light, which can pass through dichroic filter 1104(B), is reflected by dichroic filter 1104(R) onto red display device 1000(R). The green component of the light passes through both of dichroic filters 1104(R) and 1104(B) and is reflected by a mirror 1106 onto green display device 1000(G). In addition to separating the illumination beam into red, green, and blue components, dichroic filters 1104(R) and 1104(B) also recombine the red, green, and blue components after they are individually modulated by the respective red, green, and blue display devices 1000(R), 1000(G), and 1000(B) into a modulated beam containing an image that is intended to be displayed.

FIG. 11A also illustrates how two different light rays 1108 and 1110 will impinge on the respective display devices 1000(R), 1000(G), and 1000(B) at different locations across their long dimensions. (The long dimension of each of display devices 1000(R), 1000(G), and 1000(B) correspond to the long dimension defined by long edges 530 and 534 of the display device 1000 shown in FIG. 10.) For example, components of light ray 1108 (long dashes) strike display devices 1000(R), 1000(G), and 1000(B) on the right sides of their pixel arrays. In contrast, components of light ray 1110 (short dashes) strike display devices 1000(R), 1000(G), and 1000(B) on the left sides of their pixel arrays.

Figure 2:
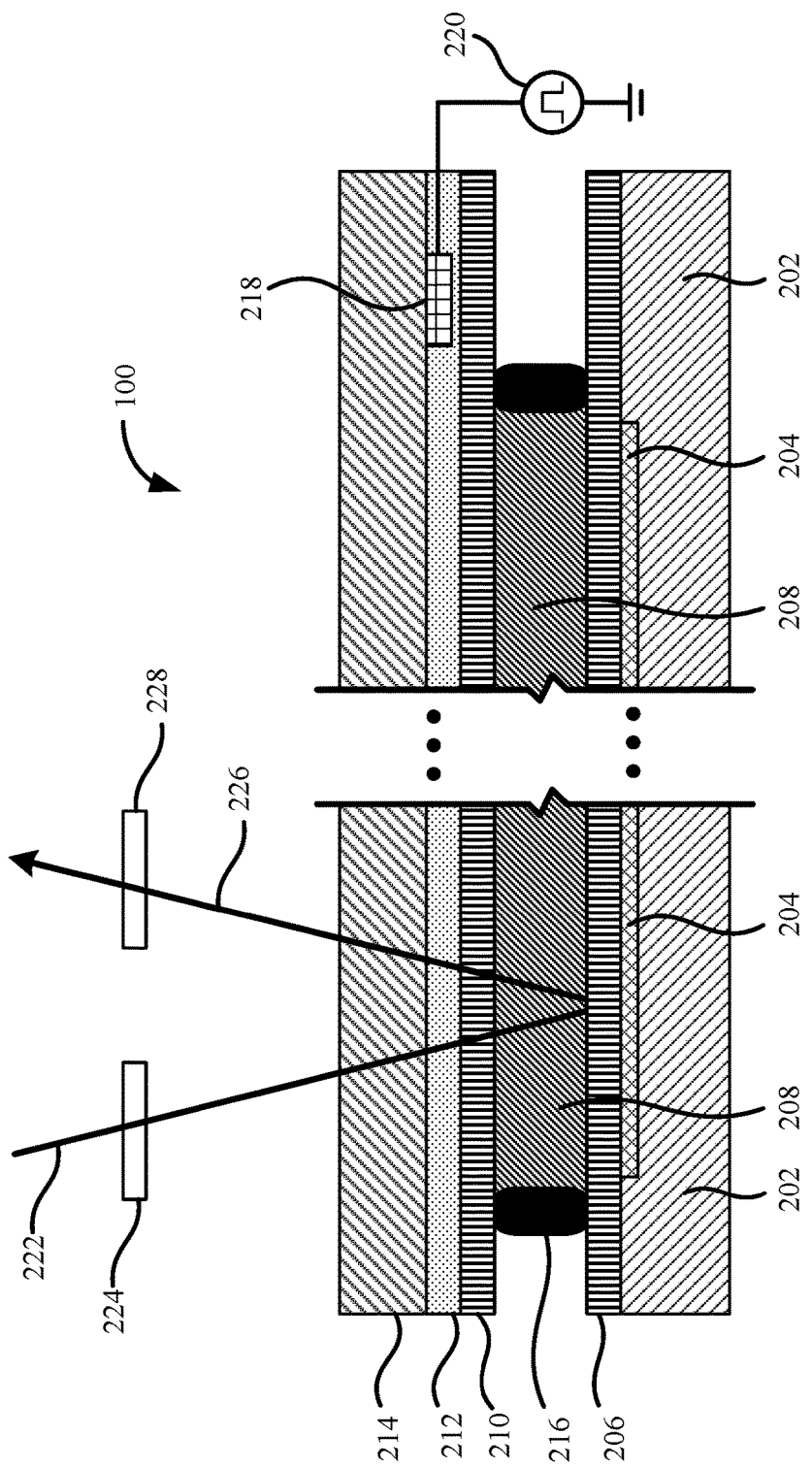
FIG. 2 is a cross-sectional view of the prior art display device of FIG. 1.
Figure 3:
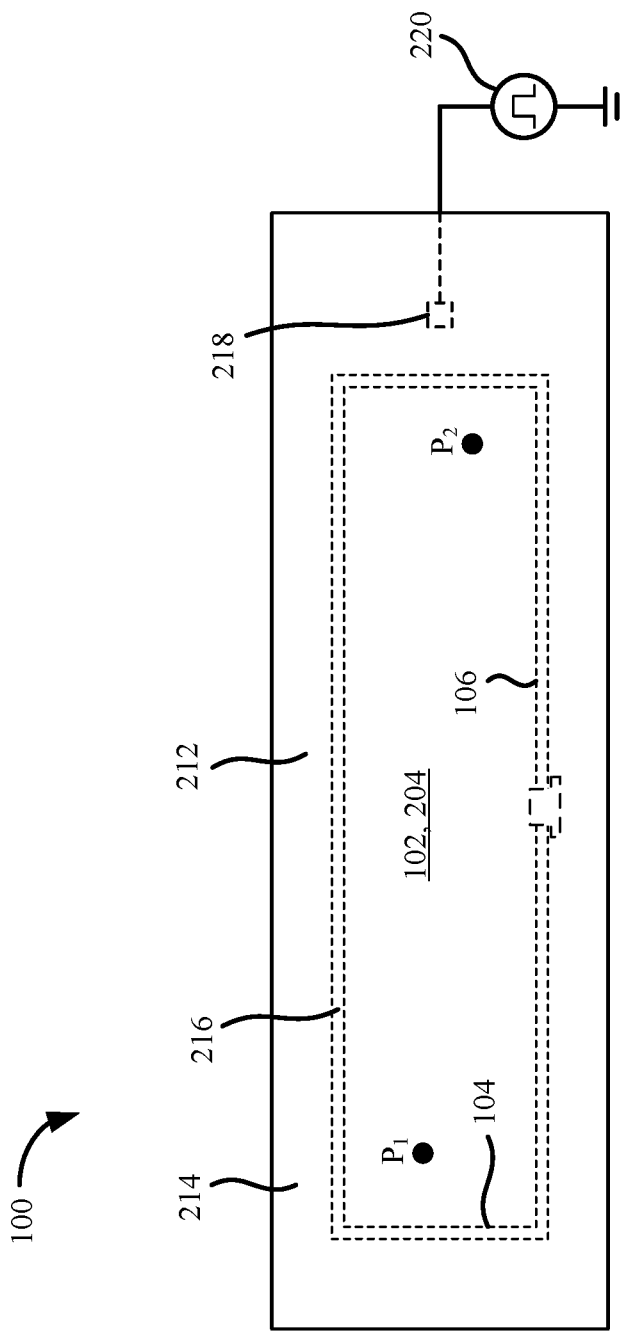
FIG. 3 is a top view of the prior art display device of FIG. 1.

Because display system 1100 includes display devices 1000(R), 1000(G), and 1000(B) of the present invention, it produces displayable images that have substantially more uniform representations of particular colors over the entire image. To better illustrate this advantage, first consider a hypothetical where display devices 1000(R), 1000(G), and 1000(B) are replaced with prior art display devices 100 (FIGS. 1-3). In such a case, if a prior art display device 100 was modulating each of the red components of light rays 1108 and 1110 according to the same intensity value (e.g., data corresponding to 100% intensity, data corresponding to 70% intensity, etc.), then the resulting intensities imparted in the reflected, modulated red components 1108 and 1110 would be significantly different due to the impedance variation across the transparent electrode 212 of the prior art display device 100. This same effect would occur from prior art display devices 100 modulating the green and blue components of light rays 1108 and 1110, respectively. Thus, due to these intensity variations, if prior art display devices 100 were used, a particular color would appear differently at different locations in the displayed image.

FIG. 11B is a table 1120 showing the cumulative effect of these intensity variations in 3-color display systems using prior art display devices 100. The inventors found that the intensity variation in each of the prior art displays 100 actually creates different white points associated with different locations of the reproduced images. (The white point corresponds to the color of white obtained when driving each of the red, green, and blue displays at full intensity.) For example, table 1120 shows chromaticity coordinates in a CIE color space that produce white light for light rays striking right and left positions on the prior art displays 100, when each of their transparent electrodes 212 is driven by high ITO voltage frequency. As shown, the coordinates for the white points of the right and left rays vary along the x chromaticity axis by 0.0268 (approximately 8.2% relative to the larger coordinate value). Similarly, the coordinates for the white points of the right and left rays vary along the y chromaticity axis by 0.0399 (approximately 11.7%). Because of these variations, light incident on pixels at different locations that are intended to produce a desired color will instead have a noticeably different color in the displayed image.

In contrast, each of display devices 1000(R), 1000(G), and 1000(B) of display system 1100 includes an input electrode 1018, which reduces the impedance variation across the portion of transparent electrode 1012 overlying its pixel array 508. Therefore, for a 3-color display system 1100 incorporating display devices 1000(R), 1000(G), and 1000(B), the differences in each of the x and y chromaticity coordinates for white light can be reduced to less than 0.01 across the entire image when the transparent electrodes 1012 of display devices 1000(R), 1000(G), and 1000(B) are driven with high frequency voltage waveforms. A similar, although less dramatic, improvement is also observed when the transparent electrodes 1012 are driven with low frequency voltage waveforms.

It should be noted here that the advantages provided by the present invention are not limited to color separation and recombination display systems, but are also realized in other multi-color display systems using LCoS display devices (e.g., field-sequential display systems, etc.) It should also be noted that FIG. 11A is shown representationally to illustrate an advantage of the invention in 3-color systems. Therefore, other elements commonly found in such display systems (e.g., lenses, light sources, polarizers, analyzers, etc.) are not shown in FIG. 11A so as not to unnecessarily complicate the present invention.

An exemplary method for manufacturing a display device according to the present invention will now be described with reference to FIG. 12. For the sake of clear explanation, this method might be described with reference to particular elements of the previously-described embodiments. However, it should be noted that other elements, whether explicitly described herein or created in view of the present disclosure, could be substituted for those cited without departing from the scope of the present invention. Therefore, it should be understood that the method is not limited to any particular elements that perform any particular functions. Furthermore, some steps need not necessarily occur in the order shown and, indeed, two or more method steps may occur simultaneously. These and other variations of the method disclosed herein will be readily apparent, especially in view of the description of the present invention provided previously herein, and are considered to be within the full scope of the invention.

Figure 12:
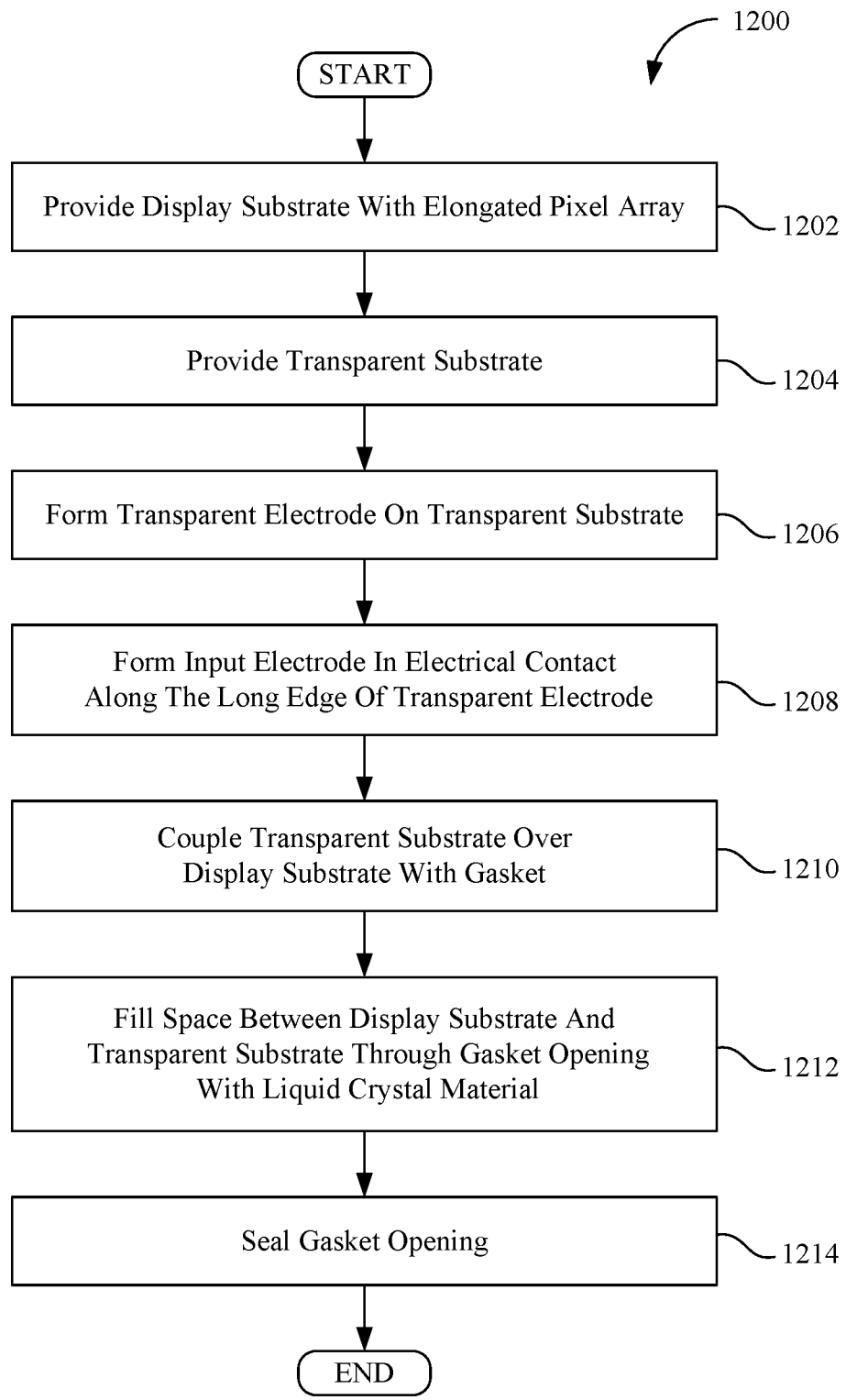
FIG. 12 is a flowchart summarizing an exemplary method for manufacturing a display device according to the present invention.

FIG. 12 shows a flowchart summarizing a method 1200 for manufacturing a display device having an input electrode according to the present invention. In a first step 1202, a display substrate (e.g., a silicon substrate, etc.) is provided having an elongated pixel array formed therein. In a second step 1204, a transparent substrate is provided, and in a third step 1206, a transparent electrode is formed from a thin, conductive material (e.g., ITO) on the transparent substrate such that the transparent electrode has a first edge extending in a first direction and a second edge extending in a second direction, where the first edge is longer than the second edge. In a fourth step 1208, an input electrode is formed in electrical contact at least along a long edge of the transparent electrode, where the input electrode has lower impedance than a portion of the transparent electrode overlying the pixel array. Then, in a fifth step 1210, the transparent substrate is coupled over the display substrate using a gasket, and in a sixth step 1212, the space between the display substrate and the transparent substrate is filled with liquid crystal material via an opening in the gasket. In a seventh step 1214, the opening in the gasket is sealed, for example, with a plug.

The description of particular embodiments of the present invention is now complete. Many of the described features may be substituted, altered or omitted without departing from the scope of the invention. For example, alternative input electrode designs can be used (e.g., L-shaped electrodes at opposing corners of the pixel array, individual electrodes along each edge of the transparent electrode, etc.), may be substituted for the input electrode designs shown. As another example, while the disclosed embodiments show electrodes that provide continuous electrical connections along their lengths to the transparent electrode, in other embodiments the input electrode could be modified to provide multiple spaced apart electrical connections along edge(s) of the transparent electrode. As yet another example, an input electrode of the present invention can be employed in a display device with a transparent electrode having a long-edge-to-short-edge ratio of 10:1 or more. These and other deviations from the particular embodiments shown will be apparent to those skilled in the art, particularly in view of the foregoing disclosure.

I claim:

1. A liquid crystal display device comprising:
   a first substrate;
   a pixel array formed on said first substrate;
   a transparent substrate disposed a spaced distance over said pixel array;
   a liquid crystal layer disposed between said pixel array and said transparent substrate;
   a transparent electrode disposed between said transparent substrate and said liquid crystal layer, said transparent electrode being formed from a thin, conductive material, said transparent electrode having a first edge extending in a first direction and a second edge extending in a second direction, said first edge being longer than said second edge;

an input electrode extending along and electrically coupled along said first edge of said transparent electrode, said input electrode having lower impedance than a portion of said transparent electrode overlying said pixel array; and a liquid crystal alignment layer formed directly on said transparent electrode; and wherein said input electrode is disposed between said transparent electrode and said liquid crystal alignment layer.

2. The liquid crystal display device of claim 1, wherein said input electrode additionally extends along and is electrically coupled along said second edge of said transparent electrode.

3. The liquid crystal display device of claim 2, wherein:
said transparent electrode further includes a third edge opposite said first edge and extending along said first direction; and
said input electrode additionally extends along and is electrically coupled along said third edge of said transparent electrode.

4. The liquid crystal display device of claim 3, wherein:
said transparent electrode further includes a fourth edge opposite said second edge and extending along said second direction; and
said input electrode additionally extends along and is electrically coupled along said fourth edge of said transparent electrode.

5. The liquid crystal display device of claim 1, further comprising:
a second input electrode extending along and electrically coupled along a third edge of said transparent electrode, said third edge located opposite said first edge and extending along said first direction; and wherein
said second input electrode has lower impedance than said portion of said transparent electrode overlying said pixel array.

6. The liquid crystal display device of claim 1, wherein said first substrate comprises a reflective liquid crystal on silicon (LCOS) backplane.

7. The liquid crystal display device of claim 1, wherein said transparent electrode comprises Indium Tin Oxide (ITO).

8. The liquid crystal display device of claim 1, wherein said input electrode comprises aluminum.

9. The liquid crystal display device of claim 1, wherein said input electrode is formed from a material having a higher electrical conductivity than said conductive material of said transparent electrode.

10. The liquid crystal display device of claim 1, wherein a length of said input electrode along said first direction is greater than a length of said pixel array along said first direction.

11. The liquid crystal display device of claim 1, wherein said liquid crystal alignment layer is formed over said input electrode.

12. The liquid crystal display device of claim 1, wherein a ratio of the length of said first edge to the length of said second edge is at least 5:1.

13. The liquid crystal display device of claim 12, wherein the thickness of said conductive material of said transparent electrode is approximately 20 nanometers.

14. The liquid crystal display device of claim 1, wherein said input electrode is in direct contact with said transparent electrode along said first edge of said transparent electrode.

15. The liquid crystal display device of claim 1, wherein said input electrode is a thin metallic film formed directly on said transparent electrode.

16. A method for manufacturing at least a portion of a liquid crystal display device having a pixel array, said method comprising:
providing a transparent substrate having a transparent electrode formed thereon, said transparent electrode being formed from a thin, conductive material and having a first edge extending in a first direction and a second edge extending in a second direction, said first edge being longer than said second edge;
forming an input electrode that extends along said first edge of said transparent electrode and that is electrically coupled to said transparent electrode along said first edge; and
forming a liquid crystal alignment layer directly on said transparent electrode; and
wherein said input electrode is disposed between said transparent electrode and said liquid crystal alignment layer; and
said input electrode has lower impedance than a portion of said transparent electrode for overlying said pixel array.

17. The method of claim 16, further comprising forming said input electrode on said transparent electrode such that said input electrode additionally extends along and is electrically coupled along said second edge.

18. The method of claim 17, wherein:
said transparent electrode further includes a third edge opposite said first edge and extending along said first direction; and
said method further includes forming said input electrode on said transparent electrode such that said input electrode additionally extends along and is electrically coupled along said third edge.

19. The method of claim 18, wherein:
said transparent electrode further includes a fourth edge opposite said second edge and extending along said second direction; and
said method further includes forming said input electrode on said transparent electrode such that said input electrode additionally extends along and is electrically coupled along said fourth edge.

20. The method of claim 16, further comprising:
forming a second input electrode extending along a third edge of said transparent electrode and being electrically coupled to said transparent electrode along said third edge; and wherein
said second input electrode has lower impedance than said portion of said transparent electrode for overlying said pixel array; and
said third edge of said transparent electrode is located opposite said first edge and extends along said first direction.

21. The method of claim 16, further comprising:
providing a display substrate having said pixel array formed thereon;
mounting said transparent substrate over said display substrate such that said transparent electrode faces said pixel array; and
forming a liquid crystal layer between said transparent electrode and said pixel array.

22. The method of claim 16, wherein said step of forming said input electrode includes forming said a thin metallic film directly on said transparent electrode.

23. A liquid crystal display device comprising:
- a first substrate;
- a pixel array formed on said first substrate;
- a transparent substrate disposed a spaced distance over said pixel array;
- a liquid crystal layer disposed between said pixel array and said transparent substrate;
- a transparent electrode disposed between said transparent substrate and said liquid crystal layer, said transparent electrode being formed from a thin, conductive material, said transparent electrode having a first edge extending in a first direction and a second edge extending in a second direction, said first edge being longer than said second edge; and
- means for uniformly asserting a high-frequency signal along said first edge of said transparent electrode overlying said pixel array; and
- a liquid crystal alignment layer formed directly on said transparent electrode; and
- wherein said means for uniformly asserting a high-frequency signal along said first edge of said transparent electrode overlying said pixel array is disposed between said transparent electrode and said liquid crystal alignment layer.

24. The liquid crystal display device of claim 23, wherein said means for uniformly asserting a high-frequency signal includes a thin metallic film formed directly on said transparent electrode.

* * * * *